United States Patent
Nakamura et al.

(10) Patent No.: US 9,854,301 B2
(45) Date of Patent: Dec. 26, 2017

(54) VIDEO TRANSMISSION SYSTEM AND VIDEO RECEIVER

(71) Applicant: Media Global Links Co., Ltd., Kawasaki-shi, Kanagawa (JP)

(72) Inventors: Kazunori Nakamura, Kawasaki (JP); Kazuki Narita, Kawasaki (JP)

(73) Assignee: MEDIA GLOBAL LINKS CO., LTD., Kawasaki (JP)

( * ) Notice: Subject to any disclaimer, the term of this patent is extended or adjusted under 35 U.S.C. 154(b) by 0 days.

(21) Appl. No.: 15/258,532

(22) Filed: Sep. 7, 2016

(65) Prior Publication Data

US 2017/0070772 A1 Mar. 9, 2017

(30) Foreign Application Priority Data

Sep. 9, 2015 (JP) ................. 2015-178012

(51) Int. Cl.
*H04N 7/173* (2011.01)
*H04N 21/438* (2011.01)
(Continued)

(52) U.S. Cl.
CPC ... *H04N 21/4383* (2013.01); *H04N 21/23406* (2013.01); *H04N 21/2404* (2013.01);
(Continued)

(58) Field of Classification Search
CPC ......... H04N 21/4383; H04N 21/44209; H04N 21/64746; H04N 21/44004;
(Continued)

(56) References Cited

U.S. PATENT DOCUMENTS

| 7,383,346 B2* | 6/2008 | Gemmell | .......... H04L 29/06027 375/E7.012 |
| 8,989,006 B2* | 3/2015 | Jost | .................. H04N 21/23439 370/235 |

(Continued)

FOREIGN PATENT DOCUMENTS

| JP | 2000-341335 A | 12/2000 |
| JP | 2008-227599 A | 9/2008 |

(Continued)

OTHER PUBLICATIONS

Sudo, Naohiro et al.,"The Journal of the Instution of Image Information and Television Engineers," Broadcasting Facilities and Operation, (2013) vol. 67, No. 5, pp. 401-408.
(Continued)

*Primary Examiner* — Michael B Pierorazio
(74) *Attorney, Agent, or Firm* — Oliff PLC (57) ABSTRACT

Provided are a video-signal switching method and a video receiver having two functions: a switching function between video signals in a currently-active system and in a backup system; and a switching function between two different videos. The present invention provides a video transmission system including video transmitters, a network connected to the video transmitters, and a video receiver connected to the network and configured to receive video streams of two IP-packetized video contents from the video transmitters. The video receiver has: a function of switching from an outputting video stream, which is continuously received but no longer receivable, to the other video stream of the same video content; and functions of stopping receiving one of the two video streams from the video transmitters, receiving the other video stream having a different video content, and switching the outputting video stream to the other video stream thus received.

5 Claims, 5 Drawing Sheets

(51) Int. Cl.
  *H04N 21/234* (2011.01)
  *H04N 21/643* (2011.01)
  *H04N 21/24* (2011.01)
  *H04N 21/4425* (2011.01)
  *H04N 21/44* (2011.01)
  *H04N 21/442* (2011.01)
  *H04N 21/462* (2011.01)
  *H04N 21/647* (2011.01)

(52) U.S. Cl.
  CPC . *H04N 21/44004* (2013.01); *H04N 21/44016* (2013.01); *H04N 21/4425* (2013.01); *H04N 21/44209* (2013.01); *H04N 21/4622* (2013.01); *H04N 21/64322* (2013.01); *H04N 21/64738* (2013.01); *H04N 21/64746* (2013.01)

(58) Field of Classification Search
  CPC ....... H04N 21/64738; H04N 21/44016; H04N 21/4622; H04N 21/23406; H04N 21/2404; H04N 21/4425; H04N 21/64322
  USPC .......................................................... 725/116
  See application file for complete search history.

(56) References Cited

U.S. PATENT DOCUMENTS

| | | | | |
|---|---|---|---|---|
| 9,246,692 | B2* | 1/2016 | Grossman | H04N 21/2381 |
| 9,571,896 | B2* | 2/2017 | Dang | H04L 65/4084 |
| 2005/0182823 | A1* | 8/2005 | Schmidt | H04L 67/42 |
| | | | | 709/216 |
| 2009/0094319 | A1* | 4/2009 | Lee | G06F 17/30047 |
| | | | | 709/203 |
| 2009/0097496 | A1* | 4/2009 | Nakamura | H04N 5/268 |
| | | | | 370/419 |
| 2010/0260254 | A1* | 10/2010 | Kimmich | H04N 21/631 |
| | | | | 375/240.01 |
| 2011/0083037 | A1* | 4/2011 | Bocharov | H04N 21/23116 |
| | | | | 714/4.11 |
| 2011/0191439 | A1* | 8/2011 | Dazzi | G06F 15/16 |
| | | | | 709/217 |
| 2011/0191446 | A1* | 8/2011 | Dazzi | G06F 15/16 |
| | | | | 709/219 |
| 2012/0185907 | A1* | 7/2012 | Park | H04N 21/236 |
| | | | | 725/110 |
| 2012/0198498 | A1* | 8/2012 | Donnelly | H04N 5/44543 |
| | | | | 725/41 |
| 2013/0024900 | A1* | 1/2013 | Suh | H04N 21/2353 |
| | | | | 725/100 |
| 2013/0111057 | A1* | 5/2013 | Yoon | H04N 21/2225 |
| | | | | 709/231 |
| 2013/0227080 | A1 | 8/2013 | Gao et al. | |
| 2013/0254828 | A1 | 9/2013 | Reimers et al. | |
| 2016/0037235 | A1* | 2/2016 | Nakamura | H04N 21/23602 |
| | | | | 725/110 |
| 2016/0142770 | A1* | 5/2016 | Waller | H04N 21/2362 |
| | | | | 725/110 |

FOREIGN PATENT DOCUMENTS

| | | |
|---|---|---|
| WO | 2016039135 A1 | 3/2016 |
| WO | 2016059365 A1 | 4/2016 |

OTHER PUBLICATIONS

Jan. 10, 2017 Office Action issued in Japanese Patent Application No. 2015-178012.
Jan. 16, 2017 Extended Search Report issued in European Patent Application No. 16187648.7.

* cited by examiner

VIDEO TRANSMISSION SYSTEM AND VIDEO RECEIVER

CROSS-REFERENCES TO RELATED APPLICATIONS

This application claims the benefit of Japanese Patent Application No. 2015-178012, filed Sep. 9, 2015, which is hereby incorporated by reference wherein in its entirety.

BACKGROUND OF THE INVENTION

Field of the Invention

The present invention relates to switching method and a video transmission system for a real-time video content. More specifically, the present invention relates to a video receiver configured to selectively switch and output multiple video streams distributed through an IP network, and a method for providing video streams to the video receiver from the network used for the video transmission.

Description of the Related Art

Broadcasting stations receive many video contents from multiple facilities, for example, stadiums, other broadcasting stations, production trucks, and the like. Moreover, broadcasting stations themselves also produce multiple video contents inside the stations. In order to distribute such many video contents, the videos have to be switched at real-time timings.

There are roughly two schemes for switching video contents. First, the first switching scheme for video is the scheme in which a currently distributed video content is switched to another video content that is different content from the currently distributed video content. By this scheme, for example, a video content captured by a camera a is switched to a video content captured by a camera b.

The second switching scheme for video content, a video content in a currently-active system is switched to a video content in a backup system in a case where there are redundant transmission paths for video contents. In the second switching scheme, when a failure occurs in a path through which a video content is being transmitted and received, the path for receiving the video content is changed to another path in order to prevent interruption of video distribution.

Thanks to the recent progress in the information technology (IT), the broadcasting system is now in a shifting phase to an Internet Protocol (IP)-based broadcasting system. Hence, IP networks are used in many cases to distribute video contents inside and outside of broadcasting stations. This trend is described in, for example, "The Journal of The Institution of Image Information and Television Engineers, VOL. 67, NO. 5, (2013) 'Broadcasting Facilities and Operations'" (Naohiro Sudo, Hidenori Ishida, Akira Hotta, Tomomi Fukazawa, Tsukuru Kai, and Hitoshi Yanagisawa). In these IP-based broadcasting systems, video signal is IP packetized to be transferred using the Real-time Transport Protocol (RTP). Thus, creating a broadcasting system in the form of an IP-based broadcasting system requires a video transmission system designed for use in an IP network.

SUMMARY OF THE INVENTION

In the above-described first switching scheme for video content, a scheme called seamless switching is becoming popular as a scheme for switching outputs of IP-packetized streams of video contents. Seamless switching is a scheme in which when IP streams of video contents received by a video receiver are to be switched, timings are matched between a border of a video frame of a video stream before the switching and a border of a video frame of a video stream after the switching such that the video contents are switched at the borders of the two video frames. For the matching between the timings of the borders of the video frames, the video stream after the switching is inputted in the video receiver in advance and buffered by a buffer provided in the video receiver.

Adopting this scheme enables switching from one video content to another video content without video interruption in the video signal. However, since the video receiver receives two video streams temporarily, the bandwidth of the video signals received doubles.

Meanwhile, in the above-described second switching scheme for video content, the scheme for switching outputs of IP-packetized streams of a video content includes a method called seamless protection specified in SMPTE 2022-7 "Seamless Protection Switching of SMPTE 2022 IP Datagrams." In this method, IP streams in a currently-active system and in a backup system prepared from the same video content are received from different paths, and if a path of the IP stream in the currently-active system fails, the IP stream in the currently active system is switched to one in the backup system. This scheme may be sometimes called hitless protection. Hereinafter, for simplification of the description, the above-described seamless protection is referred to as hitless protection. For switching of video streams without causing any deterioration in images outputted from the video receiver, the IP streams in the currently-active system and in the backup system are buffered by buffers in the video receiver so that the delays of the currently-active system and backup system are adjusted equally by the buffer to match the timings of Ethernet packets having the same payload at the time of video switching. When hitless protection is employed, the bandwidth of the video signals received doubles because the video receiver has to continuously receive two video streams.

Here, considered is a video receiver having a configuration capable of two switching schemes, that is, the first switching scheme for video content and the second switching scheme for video content. In this case, the first switching scheme for video content requires that two video streams before the switching and after the switching should be received temporarily around the switching. Meanwhile, the second switching scheme for video content requires that two video streams should be received continuously. These bring about a problem that bandwidth large enough to allow four streams to flow temporarily is required for an input into the video receiver.

Moreover, the first switching scheme for video content requires a buffer to match the timings between an IP stream before the switching and an IP stream after the switching. Further, the second switching scheme for video content requires buffers for the respective streams so that the delays of the currently-active system and the backup system can be matched. As a result, problems arise that the size of the video receiver is increased, also increasing the cost of the video receiver by itself.

The present invention has been made in view of such problems. An object of the present invention is to provide a video transmission system and an inexpensive video receiver which enable: switching video contents by both seamless switching and hitless protection; and a reduction in the bandwidth required for an input into the receiver.

In order to achieve such an object, a first aspect of the present invention is a video transmission system characterized as follows. Specifically, the system includes: one or a plurality of video transmitters configured to transmit a video stream having IP-packetized video content, and having functions of preparing two video streams from one video content and transmitting the video streams; a video receiver configured to receive the video streams; and a network connecting the video transmitters and the video receiver, the network configured to transmit the two video streams to the video receiver and configured to transmit to the video receiver a video stream selected from video streams of multiple contents transmitted by the video transmitters. The system has: a first switching function of causing the video receiver to switch, when a failure is detected in receiving a first video stream which is outputted by the video receiver and is one of the two video streams continuously received by the video receiver, from the first video stream, without losing data on the video content, to a second video stream which is not outputted by the video receiver and is the other one of the two video streams; and a second switching function of causing the video receiver to switch from a video stream being received, without video interruption, to an IP-packetized video stream of a video content different from a video content of the video stream being received. When the system is operating with the first switching function, the network transmits the two IP streams to the video receiver. Meanwhile, when the system is operating with the second switching function, the network stops transmitting one of the two video streams, but transmits the other video stream.

Moreover, a second aspect of the present invention is a video receiver characterized as follows. Specifically, the video receiver is configured to receive a video content in a form of IP-packetized first and second video streams, and to select and output one of the first and second video streams. The video receiver has: a first switching function of switching from the first video stream to the second video stream and outputting the second video stream without video interruption when the first video stream becomes no longer receivable while the video receiver continuously receives the first and second video streams of a first video content and selects and outputs the first video stream; and a second switching function of receiving a first video stream of a first video content to a second video stream of a second video content and switching from the first video stream to the second video stream of the second video content without video interruption. Here, the first video stream is of a first video content and the second video stream is of a second video content.

Further, a third aspect of the present invention is the video receiver according to the second aspect, characterized as follows. The video receiver has such a function that a bandwidth for inputting the second video stream during the first switching function is used as a bandwidth for inputting the second video stream of the second video content during the second switching function. When the second switching function is performed, the switching is carried out without increasing the input bandwidth.

Furthermore, a fourth aspect of the present invention is the video receiver according to the third aspect, characterized in that a video switching point at which the video streams are switched is selected from borders between video frames of the video streams.

Furthermore, a fifth aspect of the present invention is the video receiver according to the fourth aspect, characterized in that the second switching function includes such a function that a video switching point for the first video stream and a video switching point for the second video stream of the second video content in switching from the first video stream to the second video stream of the second video content are determined based on an amount of packets buffered in a buffer of the video receiver and a state of a packet, which indicates a border of a video frame, in the buffer.

As described above, the present invention makes it possible to realize a video transmission system and an inexpensive receiver enabling: switching of both seamless switching and hitless protection; and a reduction in the bandwidth required in an input into the receiver.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the drawings.
(System Configuration)

Figure 1:
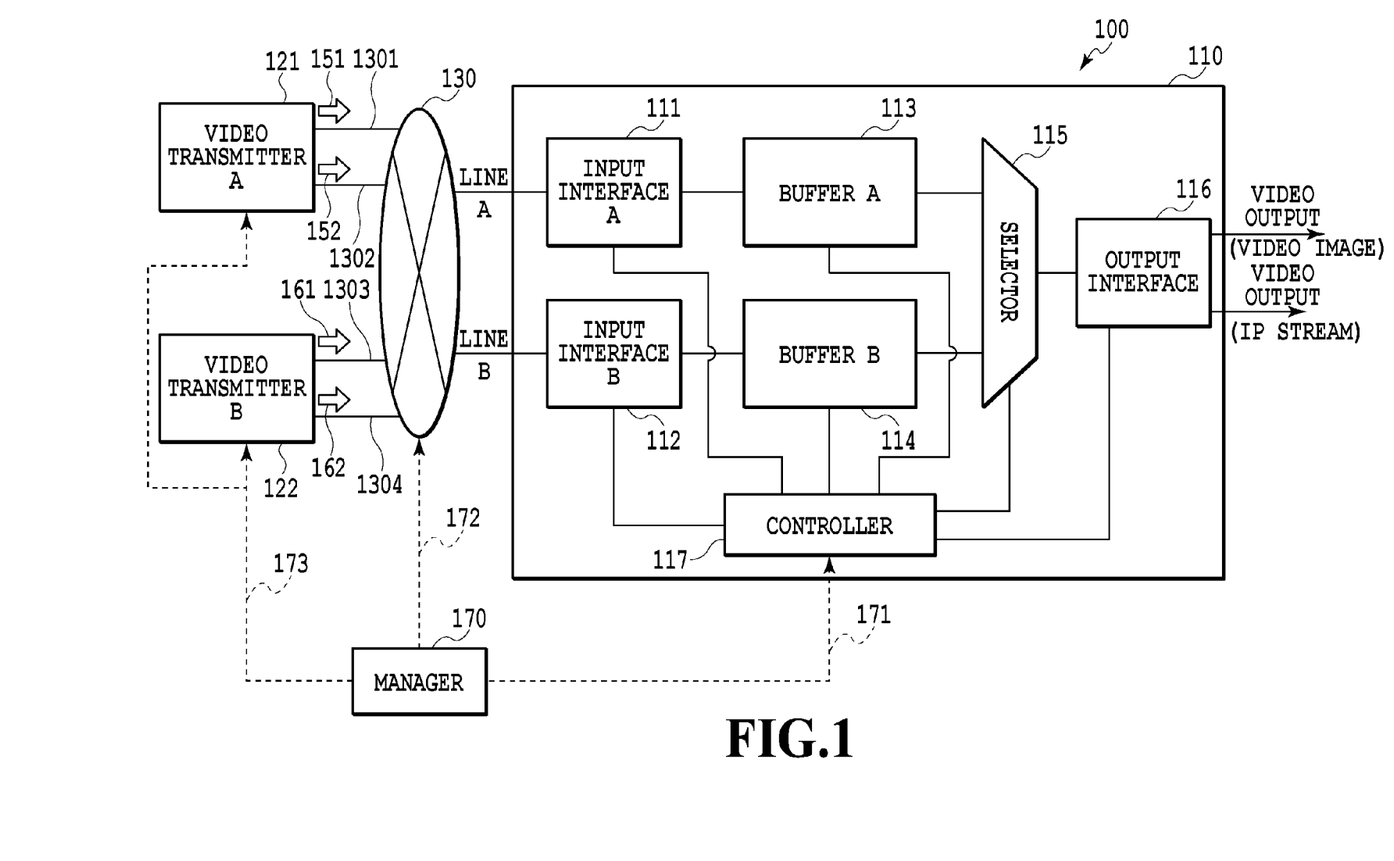
FIG. 1 is a block diagram showing a configuration of a video transmission system according to a first embodiment of the present invention.

FIG. 1 is a block diagram showing a configuration of a video transmission system 100 according to one embodiment of the present invention. The video transmission system 100 includes a video transmitter A 121 configured to transmit a video content A, a video transmitter B 122 configured to transmit a video content B, and a network 130 connected to the video transmitter A 121 and the video transmitter B 122. Moreover, the video transmission system 100 includes a video receiver 110 connected to the network 130, and a manager 170 configured to control the entire video transmission system 100. The video receiver 110 includes an input interface A 111 connected to the network 130, and a buffer A 113 connected to the input interface A 111. Moreover, the video receiver 110 includes an input interface B 112 connected to the network 130, and a buffer B 114 connected to the input interface B 112. Further, the video receiver 110 includes a selector 115 connected to the buffer A 113 and the buffer B 114, and an output interface 116 connected to the selector 115. A controller 117 is connected to the input interface A 111, the input interface B 112, the buffer A 113, the buffer B 114, the selector 115, and the output interface 116. Note that, in the present embodiment, the video transmitter A 121, the video transmitter B 122, and the manager 170 are connected to the network 130, but may be respectively connected to different networks. Additionally, multiple networks may also be connected to the video receiver 110.

The video transmitter A 121 shown in FIG. 1 is configured to IP-packetize a video content of an uncompressed video in accordance with a packet format conforming to SMPTE 2022-6, and transmit the IP-packetized video stream to the video receiver 110, for example, via 10-Gbps Ethernets 1301, 1302 and the network 130. Moreover, the video transmitter B 122 is configured to IP-packetize a video content of an uncompressed video in accordance with a packet format conforming to SMPTE 2022-6, and transmit the IP-packetized video stream to the video receiver 110, for example, via 10-Gbps Ethernets 1303, 1304 and the network 130. In the packet format conforming to SMPTE 2022-6, a video content of an uncompressed video is loaded on in the field of Media Payload of an IP packet and transmitted. The Media Payload has a fixed length of 1376 octets. Note that video streams transmitted from the video transmitter A 121 and the video transmitter B 122 are not limited to ones conforming to SMPTE 2022-6, and may be other video streams (for example, conforming to RFC 4175) of uncompressed videos, or may be video streams of compressed videos conforming to SMPTE 2022-2.

The video transmitter A 121 is configured to IP-packetize the video content A of an uncompressed video, thereby generating a video stream A 151. Moreover, the video transmitter A 121 is configured to IP-packetize the same video content A, thereby generating a video stream A' 152. The video stream A 151 is transmitted to the input interface A 111 after a first path for the video stream A 151 in the network 130 is specified by the manager 170 in accordance with, for example, OpenFlow. Further, the video stream A' 152 is transmitted to the input interface B 112 after a second path for the video stream A' 152 different from the first path in the network 130 is specified by the manager 170 in accordance with, for example, OpenFlow. Note that the video stream A 151 and the video stream A' 152 may be generated by the same video transmitter A 121 as in the present embodiment, or may be generated by different video transmitters (for example, a video transmitter A and a video transmitter A').

In addition, the video transmitter B 122 is configured to IP-packetize the video content B of an uncompressed video different from the video content A, thereby generating the video stream B 161. Moreover, the video transmitter B 122 is configured to IP-packetize the same video content B, thereby generating a video stream B' 162. The video stream B 161 is transmitted to the input interface B 112 after a third path for the video stream B 161 in the network 130 is specified by the manager 170 in accordance with, for example, OpenFlow. Further, the video stream B' 162 is transmitted to the input interface A 111 after a fourth path for the video stream B' 162 different from the third path in the network 130 is specified by the manager 170 in accordance with, for example, OpenFlow. Note that the video stream B 161 and the video stream B' 162 also may be generated by the same video transmitter B 122 as in the present embodiment, or may be generated by different video transmitters (for example, a video transmitter B and a video transmitter B').

The manager 170 is communicatively connected to the controller 117 of the video receiver 110 via a control interface 171, communicatively connected to the network 130 via a control interface 172, and communicatively connected to the video transmitters 121, 122 via a control interface 173. The manager 170 is configured to control each device and network in the video transmission system 100 through the control interfaces 171, 172, and 173 in accordance with a protocol such as, for example, SNMP or OpenFlow. The control interfaces 171, 172, and 173 are for example 1-Gbps Ethernet networks.

Herein, in specifying the paths of video streams, for example, a network administrator statically determines the paths at once utilizing OpenFlow with the manager 170 in some cases, or dynamically determines the paths by requesting from the video receiver in accordance with IGMP or the like in some cases. The paths of video streams in the network may be set, besides with the manager 170 in accordance with OpenFlow, such that the video receiver 110 requests the path for the video stream B 161 to the network 130 using IGMP or the like. Alternatively, the paths may be set using another protocol such as Direct Flow.

Note that the network 130 is not limited to one network, and may include multiple networks. For example, different networks may be connected to the video transmitters, respectively.

The video receiver 110 has both a function of switching from a video stream in a currently-active system to a video stream in a backup system, and a function of switching from a video stream A being received to the video content B different from the video content A. Here, in the present embodiment, the video stream A 151 is a video stream in the currently-active system, and the video stream A' 152 is a video stream in the backup system, but may be vice versa. Meanwhile, similarly, the video stream B 161 is a video stream in the currently-active system, and the video stream B' 162 is a video stream in the backup system, but may be vice versa. In addition, the video streams A 151 and A' 152 are different video content streams from the video streams B 161 and B' 162.

In the video transmission system 100, a path from the network 130 to the selector 115 via the input interface A 111 and the buffer A 113 is referred to as a line A. On the other hand, a path from the network 130 to the selector 115 via the input interface B 112 and the buffer B 114 is referred to as a line B. The selector 115 is configured to switch between the line A and the line B according to a signal from the controller 117. Moreover, the buffer A 113 and the buffer B 114 are each a FIFO buffer configured to temporarily buffer an input of video stream, match timings between a video stream before the switching and a video stream after the switching regarding the video streams A 151 and B 161, and the video streams A' 152, B' 162, match delays of the currently-active system and the backup system in hitless protection, and absorb packet arrival jitter. The buffer A 113 and B 114 are capable of setting a read pointer. The output interface 116 has a function of sending out a signal such as a video stream, which is outputted by the selector 115, to the outside. The output interface 116 has: a function of outputting an IP-packetized video stream as it is; functions of converting, into a video signal, an IP-packetized video stream of an uncompressed video conforming to SMPTE 2022-6 and sending out the video signal; and functions of converting, into a video signal, an IP-packetized video stream of a compressed video conforming to SMPTE 2022-2 and sending out the video signal. Moreover, the output interface 116 may also have functions of converting, into a video signal, a video stream of the other (for example, conforming to RFC 4175) uncompressed video and sending out the video signal.

(Video Switching Methods)

Next, the video switching methods in the video transmission system 100 will be described. When a network failure occurs in a path transmitting a video stream in the currently-active system, the video transmission system 100 is capable of switching from the video stream in the currently-active system to a video stream in the backup system without video interruption (hitless protection). Moreover, when the video content A being distributed is switched to the video content B different from the video content A, the video transmission system 100 is capable of seamlessly switching videos (seamless switching). Herein, a state in which the same video content is transmitted in the currently-active system and the backup system is referred to as a hitless switching phase, and a stage of switching a currently-active video content to another video content is referred to as a seamless switching phase.

(Hitless Switching Phase)

Figure 2:
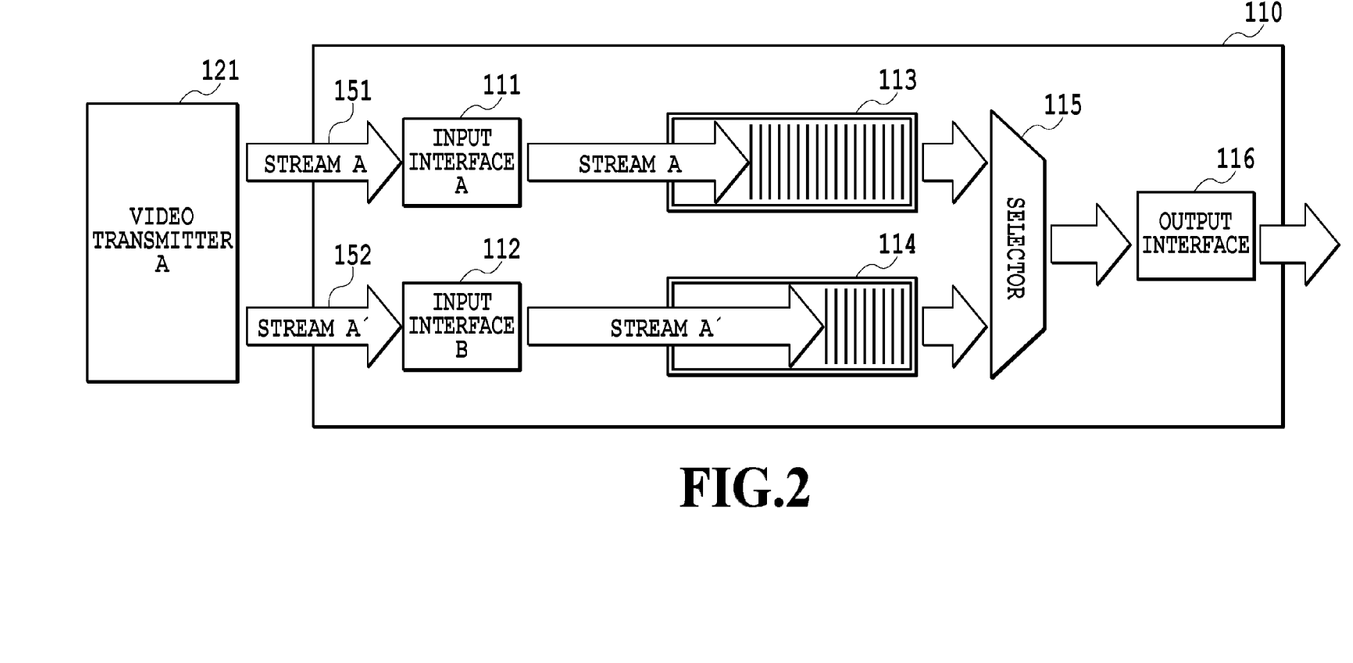
FIG. 2 is a diagram showing a state of video signal switching in a hitless switching phase of the video transmission system in FIG. 1.

Here, first of all, the hitless switching phase will be described. In the hitless switching phase, videos are switched by employing hitless protection specified in SMPTE 2022-7. Videos are switched as follows, for example. A network failure occurs in the first path transmitting the video stream in the currently-active system. Then, the controller 117 switches, with the selector 115, the path for receiving video-stream from the line A connected to the first path to the line B connected to the second path which transmits the video stream in the backup system. This switching from the line A to the line B enables the protection during the network failure. FIG. 2 is a diagram showing a state of switching of video signal in the hitless switching phase of the video transmission system 100.

In the hitless switching phase, the IP-packetized video stream A 151 in the currently-active system is transmitted from the video transmitter A 121 to the input interface A 111 of the video receiver 110 via the first path in the network 130. Moreover, the IP-packetized video stream A' 152 in the backup system is transmitted from the video transmitter A 121 to the input interface B 112 of the video receiver 110 via the second path in the network 130. The video contents in the currently-active system and the backup system are both the video content A. An RTP header and an RTP payload of the video stream A' 152 are identical to those of the video stream A 151. The other parts of the video stream A 151 and A' 152 than the RTP header and the RTP payload are discriminated by, for example, a UDP header, an IP address, a port number, a VLAN or MAC address, a physical port to be received, and the like, enabling the identifications between the video stream A 151 and the video stream A' 152.

In FIG. 2, the video stream A 151 is received from the first path in the network 130 into the input interface A 111 (line A), and written from the input interface A 111 to the buffer A 113. Meanwhile, the video stream A' 152 is received from the second path in the network 130 into the input interface B 112 (line B), and written from the input interface B 112 to the buffer B 114.

In this respect, since the video stream A 151 and the video stream A' 152 use different paths from each other, there is a time lag in the arrival to the video receiver 110 in some cases. In such a case, for the hitless switching from the video stream A 151 to the video stream A' 152 in the video receiver 110, the video stream A 151 and the video stream A' 152 have to be synchronized.

The synchronization is performed such that each of the Ethernet packets having an identical payload in the two streams are simultaneously outputted from the buffer A 113 and the buffer B 114. Here, the RTP sequence number and timestamp of the video stream A 151 as well as the RTP sequence number and timestamp of the video stream A' 152 are identified, and a video stream which needs to be delayed by the buffer (the buffer A 113 or the buffer B 114) of the video receiver 110 is sent out at a delayed timing. Note that the RTP SSRC field can be used, if possible, for the verification of matching for the two video streams. The video stream A 151 and the video stream A' 152 are further delayed for a certain time in the buffer A 113 or the buffer B 114 for the arrival jitter absorption, and then transmitted to the selector 115 of the video receiver 110 in synchronized states (in which heads of the Ethernet packets are outputted at the same timing).

In a state in which there is no failure in the network of the video stream A 151 in the currently-active system, the controller 117 of the video receiver 110 controls the selector 115 such that the video stream in the line A is sent out in order to distribute the video stream A 151 in the currently-active system.

In this respect, in a case where the path in the network of the video stream A 151 in the currently-active system fails, the video receiver 110 switches from the video stream in the currently-active system to the video stream in the backup system. The controller 117 monitors such a network failure by monitoring the video stream A 151 and the video stream A' 152 with the input interface A 111 and the input interface B 112. For example, when the controller 117 detects no arrival of the packet of the video stream A 151, a packet loss, or the like with the input interface A 111, the controller 117 switches from the video stream A 151 in the line A to the video stream A' 152 in the line B. Specifically, when the controller 117 detects a failure of the path in the network of the video stream A 151 in the currently-active system, the controller 117 immediately transmits a control signal to the selector 115 and switches the line to the line B working as the backup system. Based on the command from the controller 117, the selector 115 switches the line from A to B in units of Ethernet packet, and thereby the video receiver 110 sends out the video stream A' 152.

After that, when the network failure is recovered, the second path and the line B connected to the second path may be continuously used as the video stream path in the currently-active system, or the line B may be switched to the line A again to use the first path and the line A connected to the first path as the video stream path in the currently-active system.

(Seamless Switching Phase)

Figure 3:
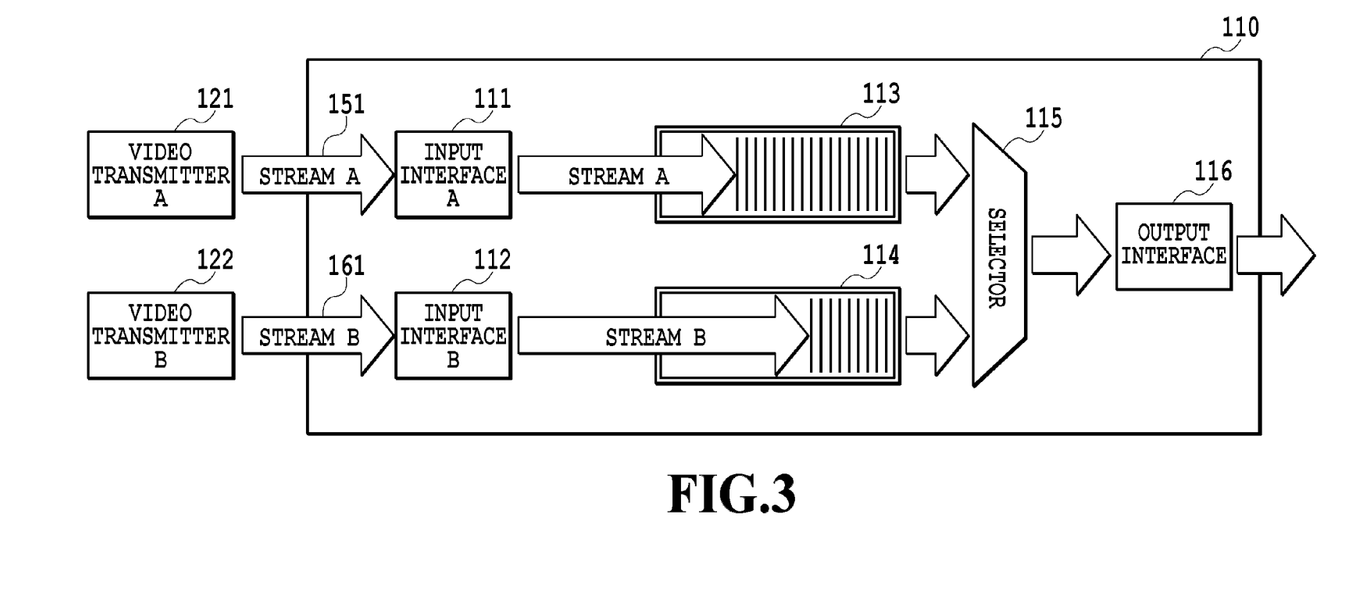
FIG. 3 is a diagram showing a state of video signal switching in a seamless switching phase of the video transmission system in FIG. 1.
Figure 4:
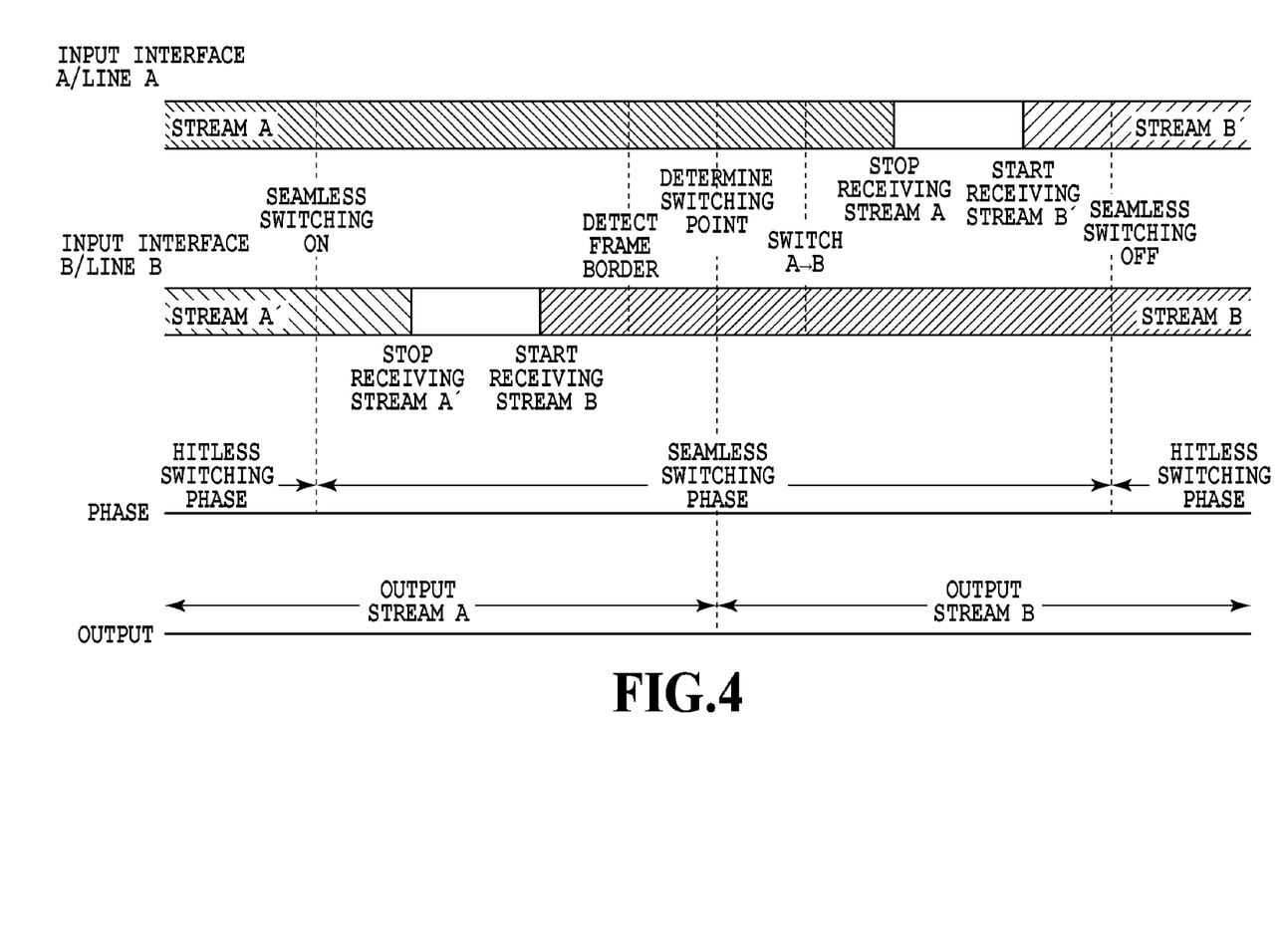
FIG. 4 is a diagram showing a state of the video signal switching and reception of video stream in the seamless switching phase.

Next, the seamless switching phase will be described. Seamless switching is a switching method without causing image deterioration in a video when the video content A being distributed is switched to the video content B different from the video content A. In seamless switching, a video stream after the switching is received in the video receiver 110 in advance, and timings are matched between a border of a video frame of the video stream after the switching and a border of a video frame of a video stream before the switching such that the video is switched at the borders of the video frames. FIG. 3 is a diagram showing a state of video stream switching in the seamless switching phase of the video transmission system 100. Moreover, FIG. 4 is a diagram showing a state of video stream reception and the video stream switching in the seamless switching phase.

Video streams are switched based on an instruction of the manager 170 (FIG. 1). During the hitless switching phase, when determined that a currently distributed video content is switched to another video content, that is, in the present embodiment, when determined that the video content A being distributed is switched to the video content B different from the video content A, the manager 170 instructs the controller 117 of the video receiver 110 via the control interface 171 to shift the hitless switching phase to the seamless switching phase, and also gives an instruction to stop receiving the video stream A' 152 at the input interface B 112. Moreover, using for example OpenFlow, the manager 170 closes the second path of the network 130 via the control interface 172, and further if necessary instructs the video transmitter A 121 via the control interface 173 to stop transmitting the video stream A' 152.

Then, using for example OpenFlow, the manager 170 sets the third path in the network 130 via the control interface 172, and instructs the controller 117 of the video receiver 110 via the control interface 171 to receive the IP-packetized video stream B 161 with the input interface B 112.

Closing the second path and setting the third path in the network 130 as described above may be performed not only by the manager 170 using OpenFlow, but also by the video receiver 110 using IGMP or the like in such a manner as to request the network 130 for the video stream B 161. Alternatively, the paths may be set using another protocol such as Direct Flow.

With reference to FIG. 4, in the hitless switching phase, the IP-packetized video stream A 151 is transmitted from the video transmitter A 121 via the first path in the network 130 to the input interface A 111 of the video receiver 110. Meanwhile, the IP-packetized video stream A' 152 is transmitted via the second path in the network 130 to the input interface B 112 of the video receiver 110. In this respect, when the shift to the seamless switching phase, as described above, the manager 170, first of all, closes the second path in the network 130, which is used as the backup system. Moreover, the manager 170 instructs the controller 117 of the video receiver 110 via the control interface 171 to stop receiving the video stream A' 152 at the input interface B 112. Next, the manager 170 sets the third path in the network 130 such that the input interface B 112 of the video receiver 110 receives the IP-packetized video stream B 161 from the video transmitter B 122. The video content B of the video stream B 161 transmitted from the video transmitter B 122 is a different content from the video content A of the video stream A 151 transmitted from the video transmitter A 121.

In the video receiver 110, the line B used as the video stream path in the backup system stops receiving the video stream A' 152, and then receives the video stream B 161 transmitted from the video transmitter B 122. At this time, the video stream A 151 flows in the line A, while the video stream B 161 flows in the line B.

Next, the respective video frame heads of the video stream A 151 and the video stream B 161 being received are detected with the input interface A 111 and the input interface B 112 of the video receiver 110. The controller 117 detects the video frame heads by observing the Ethernet packets of the video stream A 151 with the input interface A 111, and observing the Ethernet packets of the video stream B 161 with the input interface B 112. Specifically, in a case where the Ethernet packets conform to SMPTE 2022-6, a marker (M) bit of the RTP header indicates a final packet in the video frame. Hence, it is possible to detect that the subsequent Ethernet packet is a head of the video frame. In a case where the Ethernet packets conform to SMPTE 2022-2, the video frame heads are recognized using a payload unit start indicator in a TS header, or the like.

After the video frame heads are detected, the controller 117 compares the video frame borders of the video stream A 151 and the video stream B 161 being received with each other to thereby select video frame borders used as video switching points.

Figure 5:
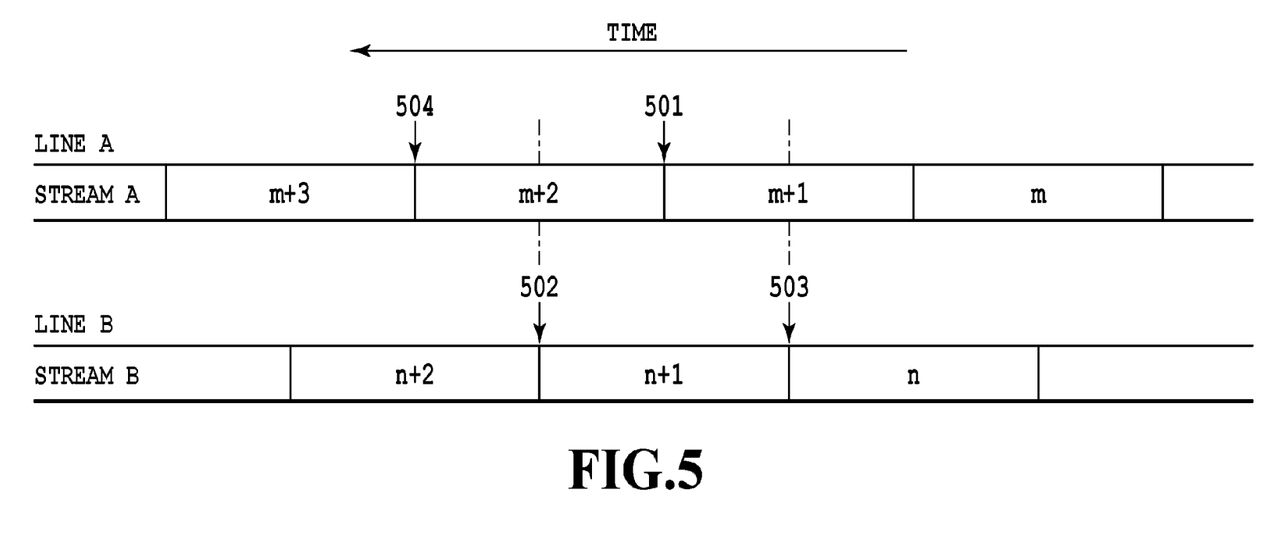
FIG. 5 is a diagram showing a relation between video streams being received and switching points in the video receiver in FIG. 1.

FIG. 5 is a diagram for illustrating the video switching points of the video streams being received in the video receiver 110.

In the present embodiment, a border point 501 between a video frame m+1 and a video frame m+2 or a border point 504 between the video frame m+2 and a video frame m+3 in FIG. 5 is a candidate of the video switching point for the video stream A 151, which is the source before the switching. Moreover, a border point 503 between a video frame n and a video frame n+1 or a border point 502 between the video frame n+1 and a video frame n+2 in FIG. 5 is a candidate of the video switching point for the video stream B 161, which is the content after the switching. The video switching points are selected based on a buffering amount of a buffer in the line of the content after the switching (in the case of the present embodiment, the buffer B 114 in the line B). Herein, the following time value X is used to calculate the buffering amount.

$X$=predetermined hitless-switching maximum delay time+packet arrival jitter

Moreover, a packet amount in the buffer is converted to time by using the following equation.

Time=the number of packets×(time of one packet of the stream+an average packet interval of the stream)

Here, the predetermined hitless-switching maximum delay time is a maximum value of a delay difference between the currently-active system and the backup system in hitless protection, which can be estimated for the network in the system, and the value is set at the time of constructing the video transmission system 100 of the present embodiment. To put it differently, if the buffer has a packet amount larger than X in terms of time, the buffer adjusts the delay by hitless protection in the hitless switching phase after the termination of the seamless switching phase to match the timings. Then the buffer enables synchronization between the currently-active system and the backup system. Note that the X value in the present embodiment is shorter than one video frame time.

Hereinafter, description will be give of cases varying in the buffering amount.

1. Case 1

Suppose a case where, when the output of the buffer A arrives at the border point 501, the buffer B contains a packet of the border point 502 (i.e., the head of the video frame n+2) and the packet amount after the border point 502 in the buffer B is larger than X in terms of time. In this case, the controller 117 sets the video frame border point 502 as a readout point from the buffer B 114, the output source selection of the selector 115 is switched to the output of the buffer B 114, and reading from the buffer B 114 is started.

2. Case 2

Suppose a case where, when the output of the buffer A arrives at the border point 501, the buffer B contains the packet of the border point 502 (i.e., the head of the video frame n+2), the packet amount after the border point 502 in the buffer B is equal to or smaller than X in terms of time, and the buffer B contains a packet of the border point 503 (i.e., the head of the video frame n+1). In this case, the controller 117 sets the video frame border point 503 as a readout point from the buffer B 114, the output source selection of the selector 115 is switched to the output of the buffer B 114, and reading from the buffer B 114 is started.

3. Case 3

Suppose a case where, when the output of the buffer A arrives at the border point 501, the buffer B contains packet of the border point 502 (i.e., the head of the video frame n+2), the packet amount after the border point 502 in the buffer B is equal to or smaller than X in terms of time, and the buffer B does not contain the packet of the border point 503 (i.e., the head of the video frame n+1). In this case, the controller 117 does not switch at the border point 501, but tries switching again at the border point 504.

4. Case 4

Suppose a case where, when the output of the buffer A arrives at the border point 501, the buffer B does not contain the packet of the border point 502 (i.e., the head of the video frame n+2) but contains the packet of the border point 503 (i.e., the head of the video frame n+1), and the packet amount after the border point 503 in the buffer B is larger than X in terms of time. In this case, the controller 117 sets the video frame border point 503 as a readout point from the buffer B 114, the output source selection of the selector 115 is switched to the output of the buffer B 114, and reading from the buffer B 114 is started.

5. Case 5

Suppose a case where, when the output of the buffer A arrives at the border point 501, the buffer B does not contain the packet of the border point 502 (i.e., the head of the video frame n+2) but contains the packet of the border point 503 (i.e., the head of the video frame n+1), and the packet amount after the border point 503 in the buffer B is equal to or smaller than X in terms of time. In this case, the controller 117 does not switch at the border point 501, but tries switching again at the border point 504.

When the switching is completed from the video stream A 151 to the video stream B 161, the manager 170 closes the first path in the network 130 with the control interface 172 using for example OpenFlow. Moreover, the manager 170 instructs the controller 117 of the video receiver 110 with the control interface 171 to stop receiving the video stream A 151 with the input interface A 111. Further, the manger 170 instructs the video transmitter A 121 with the control interface 173 to stop transmitting the video stream A 151. Next, the manger 170 sets the fourth path in the network 130, and instructs the video transmitter B 122 to start transmitting the video stream B' 162 to the input interface A 111 of the video receiver 110 via the fourth path. In addition, the manger 170 instructs the input interface A 111 of the video receiver 110 to receive the IP-packetized video stream B' 162 from the video transmitter B 122. The closing of the first path and setting of the fourth path may be performed not only by the manager 170 using OpenFlow, but also by the video receiver 110 employing a method for requesting the network 130 for the video stream B' 162 using IGMP or the like. Alternatively, the paths may be set using another protocol such as Direct Flow.

According to these instructions, the video transmitter A 121 stops transmitting the video stream A 151, and the video transmitter B 122 starts transmitting the video stream B' 162. The RTP header and the RTP payload of the video stream B' 162 are identical to those of the video stream B 161. The other parts of the video stream B 161 and video stream B' 162 than the RTP header and the RTP payload are discriminated by, for example, a UDP header, an IP address, a port number, individual physical ports, a VLAN or MAC address, a physical port to be received, and the like, enabling the identifications between the video stream B 161 and the video stream B' 162.

In the video receiver 110, the line A used as the path of the video stream A 151 before the video switching stops receiving the video stream A 151, and can receive the video stream B' 162 transmitted from the video transmitter B 122.

No stream is flowing into the input interface A 111 and the line A of the video receiver 110, when the network 130 closes the first path or the video transmitter A 121 stops transmitting the video stream A 151. After the network 130 sets the fourth path and the video transmitter B 122 starts transmitting the video stream B' 162, the video stream B' 162 flows in the input interface A 111 and the line A of the video receiver 110, while the video stream B 161 flows in the input interface B 112 and the line B, enabling hitless protection.

When the video receiver 110 starts receiving the video stream B' 162, the manager 170 instructs the controller 117 of the video receiver 110 with the control interface 171 to end the seamless switching phase, and to shift the phase to the hitless switching phase again. The controller 117 of the video receiver 110 executes the instruction.

At the stage shifted to the hitless switching phase, the video receiver 110 uses the line B as the currently-active system and the line A as the backup system. In order to use the line A as the currently-active system and the line B as the backup system again, the selector 115 may switch the video stream path from the line B to the line A. Moreover, when a network failure occurs, the video stream path is switched from the line used for the currently-active system to the line used for the backup system.

As has been described above, the present embodiment enables switching of both seamless switching and hitless protection, while only two streams are received at a time into the video receiver, and the buffers of the video receiver are used commonly in seamless switching and hitless protection. Thus, it is possible to reduce the bandwidth and cost of the entire video transmission system.

It should be noted that although two buffers corresponding to the line A and the line B are used in the present embodiment, it is obvious that physically one buffer is easily used to carry out operations logically equivalent to those of two buffers. It is also apparent that the manager in the present embodiment can be constructed using standard server and OS.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A video transmission system comprising:
   one or more video transmitters configured to:
   transmit a first video stream that is one of two video streams to which a first video content is IP-packetized;
   transmit a second video stream that is another one of the two video streams to which the first video content is IP-packetized; and
   in response to an indication for switching the first video content to a second video content:
   stop transmitting the second video stream; and
   transmit a third video stream that is one of two video streams to which the second video content is IP-packetized; and
   a video receiver configured to:
   receive the first video stream;
   store the first video stream in one or more buffers;
   receive the second video stream;
   store the second video stream in the one or more buffers;
   select and output one of the first video stream and the second video stream that are stored in the one or more buffers;
   receive the third video stream;

store the third video stream in the one or more buffers; and switch the first video content to the second video content by stopping outputting the first video stream stored in the one or more buffers and outputting the third video stream stored in the one or more buffers.

2. The video transmission system according to claim 1, wherein the video receiver is further configured to:

in response to determining that a IP packet in the first video stream stored in the one or more buffers is a final packet of one video frame in the first video content, and that a IP packet in the third video stream stored in the one or more buffers is a head packet of one video frame in the second video content, stop outputting the first video stream stored in the one or more buffers and output the third video stream stored in the one or more buffers.

3. The video transmission system according to claim 1, wherein the one or more video transmitters are further configured to:

when the first video content is switched to the second video content, stop transmitting the first video stream; and transmit a fourth video stream that is another one of the two video streams to which the second video content is IP-packetized; and the video receiver is further configured to:

receive the fourth video stream;

store the fourth video stream in the one or more buffers; and select and output one of the third video stream and the fourth video stream that are stored in the one or more buffers.

4. A video receiver configured to:

receive a first video stream that is one of two video streams to which a first video content is IP-packetized;

store the first video stream in one or more buffers;

receive a second video stream that is another one of the two video streams to which the first video content is IP-packetized;

store the second video stream in the one or more buffers;

select and output one of the first video stream and the second video stream that are stored in the one or more buffers; and in response to receiving an indication for switching the first video content to a second video content:

stop receiving the second video stream;

receive a third video stream that is one of two video streams to which the second video content is IP-packetized;

store the third video stream in the one or more buffers; and switch the first video content to the second video content by stopping outputting the first video stream stored in the one or more buffers and outputting the third video stream stored in the one or more buffers.

5. The video receiver according to claim 4, further configured to:

in response to determining that a IP packet in the first video stream stored in the one or more buffers is a final packet of one video frame in the first video content, and that a IP packet in the third video stream stored in the one or more buffers is a head packet of one video frame in the second video content, stop outputting the first video stream stored in the one or more buffers and output the third video stream stored in the one or more buffers.

* * * * *